United States Patent
Rasmussen

(10) Patent No.: US 8,277,656 B2
(45) Date of Patent: Oct. 2, 2012

(54) FILTER DEVICE

(75) Inventor: Christian Rasmussen, Tjele (DK)

(73) Assignee: Grundfos Management A/S, Bjerringbro (DK)

( * ) Notice: Subject to any disclaimer, the term of this patent is extended or adjusted under 35 U.S.C. 154(b) by 330 days.

(21) Appl. No.: 12/663,425

(22) PCT Filed: May 17, 2008

(86) PCT No.: PCT/EP2008/003984
§ 371 (c)(1), (2), (4) Date: Dec. 7, 2009

(87) PCT Pub. No.: WO2008/151707
PCT Pub. Date: Dec. 18, 2008

(65) Prior Publication Data
US 2010/0176049 A1    Jul. 15, 2010

(30) Foreign Application Priority Data
Jun. 9, 2007  (EP) .................................. 07011341

(51) Int. Cl.
*B01D 29/88* (2006.01)
*B01D 35/22* (2006.01)

(52) U.S. Cl. ........ 210/334; 210/332; 210/107; 210/357; 210/405; 210/413; 210/418; 210/420; 210/456

(58) Field of Classification Search .............. 210/340, 210/332, 343, 345, 346, 347, 405, 413, 414
See application file for complete search history.

(56) References Cited

U.S. PATENT DOCUMENTS

| 5,019,255 A * | 5/1991 | Dahlquist et al. ............. 210/225 |
| 5,326,512 A | 7/1994 | Stillwagon et al. |
| 2006/0138039 A1 | 6/2006 | Rudolf et al. |

FOREIGN PATENT DOCUMENTS

| DE | 196 24 176 A1 | 1/1998 |
| DE | 103 31 463 A1 | 3/2005 |
| EP | 0 723 799 A1 | 7/1996 |
| JP | 544225 U | 6/1993 |
| WO | 2004/069372 A2 | 8/2004 |
| WO | 2006/084858 A2 | 8/2006 |

OTHER PUBLICATIONS

Office Action issued Jun. 28, 2011 in Japanese Application No. 2010-511511.

* cited by examiner

*Primary Examiner* — Benjamin Kurtz
(74) *Attorney, Agent, or Firm* — Panitch Schwarze Belisario & Nadel LLP

(57) ABSTRACT

The filter device is provided with a housing (1) and with a stack of filter plates (10, 11) arranged therein at a spacing from one another. The housing includes an inlet (7) for the fluid to be filtered, an outlet (9) for the filtrate which is connected in a conducting manner to the inside of the filter plates (10, 11), and a cavity extending through the stack and formed by recesses in the filter plates (10, 11). The filter plate stack is arranged fixed to the housing, and a centrifugal pump (14) with several impellers (15) is arranged within the filter plate stack. This pump ensures an intensive through-flow of the filter plate stack and thus a removal of the filter residues.

12 Claims, 4 Drawing Sheets

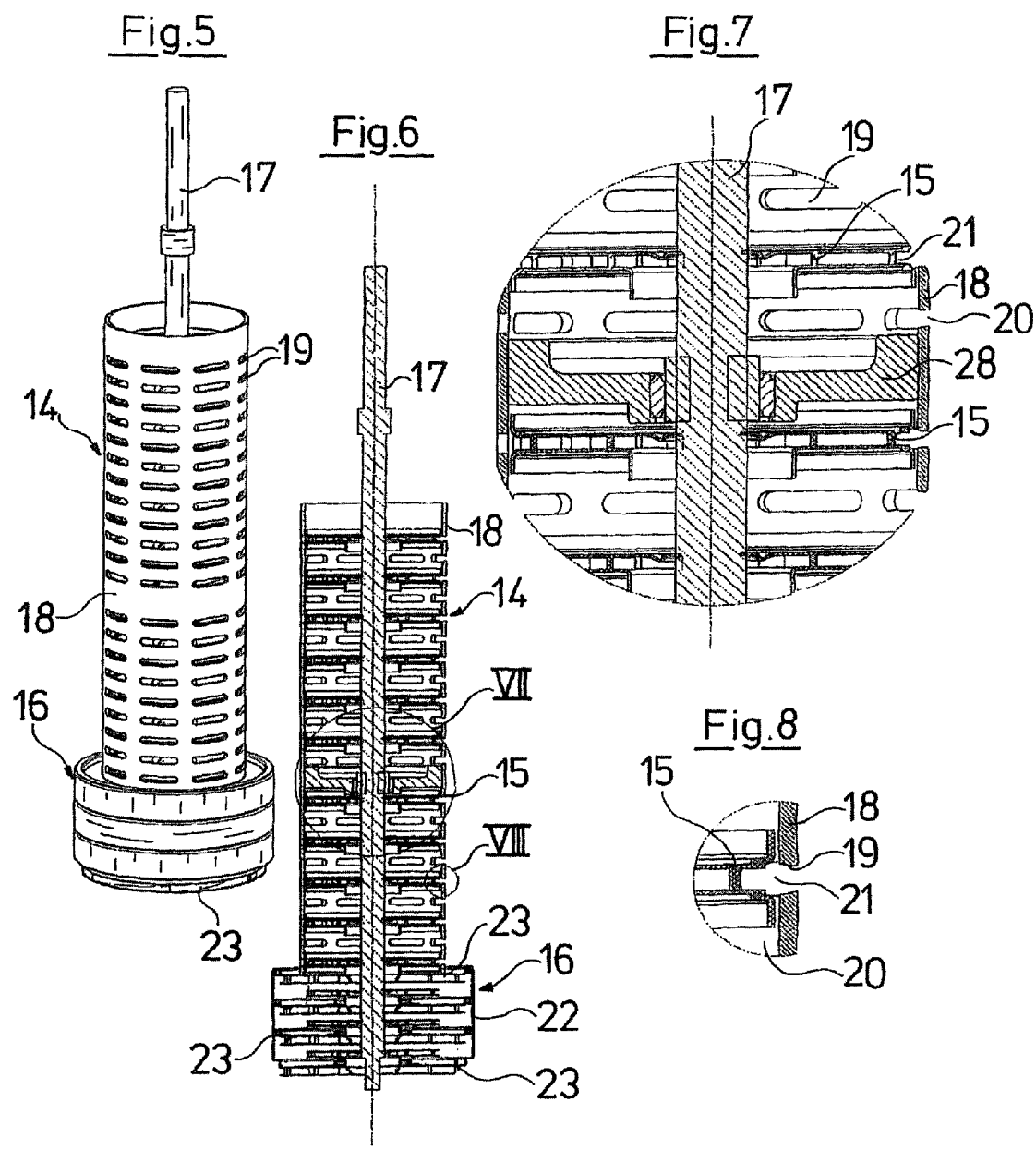

FILTER DEVICE

CROSS-REFERENCE TO RELATED APPLICATIONS

This application is a Section 371 of International Application No. PCT/EP2008/003984, filed May 17, 2008, which was published in the German language on Dec. 18, 2008, under International Publication No. WO 2008/151707 A1 and the disclosure of which is incorporated herein by reference.

BACKGROUND OF THE INVENTION

The invention relates to a filter device having a housing, a stack of filter plates arranged therein at a distance to one another, an inlet for the fluid to be filtered, an outlet for the filtrate, which is connected to the inside of the filter plates in a conducting manner, and a cavity extending through the stack and formed by recesses in the filter plates.

Known filter devices of the previously mentioned type, consist typically of stacks of hollow filter plates, which are arranged in an essentially cylindrical and closed filter housing, as the case may be, also in a rotating manner. The fluid to be filtered is introduced into the housing by a pump, goes through the filter formed in the region of the surface of the filter plates, into the inside of the plates, where the filtrate is removed via a central channel. Such filter plates are known, for example, from German published patent application DE 196 24 176 A1 or European patent application publication EP 0 723 799 A1, and corresponding filter devices are known from German published patent application DE 196 24 176 A1, as well as from U.S. Pat. No. 5,326,512.

A problem with such filter devices is always the removal of the filter cake, which forms on the surfaces of the filter plates in the course of time. These residues must be removed where possible in a continuous manner, so that such a solid covering may not be able to form in the first place. The use of mechanical scrapers requires some effort with regard to design, and is typically only used with bio-filters, in order to keep the growth of the filter surface constant. Mechanical filter devices of the type being discussed here, are therefore mostly cleaned by back-flushing, which however disturbs the continuous operation of the plant, and furthermore reduces the usable quantity of the obtained filtrate.

It is already known from DE 196 24 176 to profile the filter plate on its surface, such that a certain radial pumping effect is produced on rotation of the filter plate stack, which is to ensure a flow on the filter surface, in particular for the removal of residues on the filter surface. The disadvantage with this known arrangement, however, is the fact that the pump effect, which arises on account of the surface profiling, is comparatively low, and thus the desired effect is not achieved or only to a very small extent. A quicker rotation of the plate stack, furthermore, leads to an increased mechanical loading of the whole filter device, and requires a higher energy input.

Against this background, it is an object of the invention to design a filter device of the known type, such that one may achieve a high filter and self-cleaning effect of the filter, with a design effort as simple as possible.

BRIEF SUMMARY OF THE INVENTION

The filter device according to the invention comprises a housing, typically a closed housing, in which a stack of filter plates arranged at a distance to one another is arranged. The housing comprises an inlet for the fluid to be filtered, and an outlet which is connected in a conducting manner to the inside of the filter plates, so that the filtrate may be removed by this. A cavity which is formed by recesses in the filter plates, extends through the stack of filter plates. The filter plate stack is arranged fixed to the housing, wherein a centrifugal pump with several impellers is arranged within this filter plate stack.

This solution according to the invention permits a construction of the filter device which is simple with regard to design, since specifically, the filter plate stack is arranged in a stationary manner within the housing, which in particular is formed as a closed receptacle. The centrifugal pump with several impellers, which is arranged within the filter plate stack, may ensure an improved throughflow of the filter plates and/or an improved peripheral flow of the filter plates, depending on the design, by which the deposition of filter residues on the filter plates may be prevented or at least reduced, or these, as the case may be, may also be removed by an increased pump effect. The design according to the invention furthermore permits an extremely compact constructional shape, since the components of the pump are arranged within the filter plate stack, which furthermore also increases their effectiveness, since flow losses via pipe conduits and the like are largely avoided.

It is thus the basic concept of the present invention, to arrange the filter plate stack in a stationary manner within the housing, and to incorporate a centrifugal pump into the filter plate stack for the throughflow. Thereby, the filter plate stack, with the multi-impeller centrifugal pump lying therein, is usefully designed such that the filter plate stack forms a part of the otherwise common pump housing.

According to an embodiment of the invention, the impellers extend advantageously within the disk stack, such that they are respectively arranged between adjacent filter plates, and thus ensure a good removal of the filter residues from the filter plates. Thereby, the preferably central cavity serves for the supply of the fluid to be filtered. With such a design, the impellers are usefully designed open to both sides, thus to both adjacent filter plates, and comprise a central suction region, which lies within the cavity. With this design, the impeller may be designed in a very simple shape by a plastic injection molded part which, on rotation, may not only produce a pump effect, but also a mechanical scraping effect or at least a turbulence in the regions close to the filter surface.

Alternatively, a multi-impeller centrifugal pump may be incorporated within the cavity, which is arranged and designed such that the pressure side of the impellers is directed in an essentially radial manner, and a throughflow of the filter plate stack proceeding from the outer periphery of the impellers, along the filter surfaces, results on rotation of the impellers.

It is particularly advantageous, if the free intermediate space which is formed in each case between adjacent filter plates, is effected by an impeller of this centrifugal pump, and usefully in a manner such that an impeller is allocated to each of the adjacent intermediate spaces, so that an intensive and uniform throughflow of the complete stack is effected. It is to be understood that in order to achieve this, one may also allocate an impeller to a group of intermediate spaces lying adjacent to one another, depending on the design of the impeller with regard to height.

According to an advantageous further embodiment of the invention, the impellers are not seated directly adjacent within the filter plate stack, but are surrounded by a tubular, preferably cylindrical, intermediate housing, which is seated in the cavity formed in the filter plate stack, and to which the plate stack connects in a preferably sealing manner. Thereby, the intermediate housing comprises openings in the region of the free spaces between adjacent filter plates, by which the pressure side of the allocated impeller is connected to the associated intermediate space in a fluid-leading manner. Such an intermediate housing is advantageous for several reasons. On the one hand, one may form a sealed connection to the filter plate stack, which typically is made of ceramic materials and therefore is relatively brittle and sensitive to mechanical bending and impact loads. The intermediate housing shields the rotating part of the centrifugal pump, thus the impellers arranged therein, with respect to the filter plate stack. The intermediate housing and the impellers may be manufactured with comparatively tight tolerances, which increases the efficiency of the pump. A targeted flow through the intermediate spaces may be effected via the openings in the intermediate housing, which are advantageously designed in the manner of an elongate hole, and are arranged in a manner such that they form a free space as large as possible between the pressure side of the impeller and the associated intermediate space, and flow losses, which would occur with the flow impacting the end-sides of the filter plates, are avoided by this.

According to another embodiment of the invention, the intermediate housing may be designed of one or of several parts, and may be made of metal, plastic or other suitable materials. According to an advantageous further embodiment of the invention, the intermediate housing is constructed of several housing sections, wherein preferably each housing section is assigned to an impeller. Such housing sections may be designed in an inexpensive manner as plastic injection molded parts, and are connected to one another with a possible fit via a bayonet connection, or other suitable connection. Such a design permits a quasi modular construction of the pump, so that one may realize centrifugal pumps of a different size with the same components.

Usefully then, a filter plate is assigned to each housing section of the intermediate housing, wherein a radial sealing is effected between the outer side of the housing section and the respective filter plate, be it by the housing section itself or by a separate seal. A good sealing between the housing section and the filter plate on the one hand increases the pump effect within the filter plate stack, and on the other hand, in particular, permits the series connection of impellers lying behind one another, with the respectively assigned filter plates or filter plate intermediate spaces.

Irrespective of whether the intermediate housing is designed of housing sections or of one part, the impellers arranged within the plate stack are advantageously dimensioned such that they reach up to the vicinity of the intermediate housing, wherein according to a further embodiment of the invention, these impellers are radially sealed with respect to the intermediate housing, on the suction side as well as the pressure side, in order to achieve a pump effect as large as possible and to avoid a hydraulic short circuit in this region. Thereby, the sealing of the impellers is preferably effected on the suction side as well as on the pressure side at the same diameter, typically the inner diameter of the intermediate housing.

According to one advantageous further embodiment of the invention, one or more impellers within the housing may be fluidically arranged upstream of the impellers arranged within the plate stack. Such an arrangement has the advantage that, as the case may be, one may do away with an additional pump for charging the filter device. Furthermore, the pump effect is particularly favorable, since the pump lies directly in front of the plate stack and thus on the pressure side delivers quasi into the plate stack.

The impellers, which are arranged upstream of the impellers within the plate stack, may be designed and arranged as a multi-stage centrifugal pump, in order to subject the plate stack to an onflow with the highest possible pressure. For this, the housing of the device is then designed accordingly, thus advantageously simultaneously forms the pump housing.

The housing is advantageously adapted to the impellers in the region of the impellers arranged upstream, thus forms a quasi cylindrical recess for these impellers, and is otherwise adapted to the plate stack, which is advantageously likewise designed in a cylindrical manner. The housing may therefore be designed in a cylindrical manner in a simple shape, and may therefore by manufactured in an inexpensive manner. The housing may be formed essentially by a cylinder tube, which is stepped as the case may be, with two lids on the inner side, wherein the lids are designed for receiving the discharge or supply channels. Only the lids are to be machined in a more complex manner with such a housing design, whereas the cylindrical parts may be manufactured as turned parts or as continuous cast parts.

Usefully, the impellers within the filter plate stack, as well as the impellers arranged upstream, are seated on a common shaft. In particular, it is then advantageous if the impellers arranged upstream have a larger diameter than those arranged within the plate stack, since these then have a greater peripheral speed given the same rotation speed, and thus may develop a greater pump effect.

According to a further embodiment of the invention, the impellers are not only seated on the common shaft in a rotational fixed manner, but are also designed and arranged such that, together with the intermediate housing, they form a unit which may be handled together. This arrangement is not only particularly favorable for maintenance purposes, since the whole pump may then be withdrawn from the plate stack, but also with regard to design, in particular if the components originate from different manufacturing bases, and are not assembled until on location.

In order to securely mount the shaft, which may be designed particularly long with high filter plate stacks, usefully at least one bearing is arranged within the plate stack and advantageously supported in the intermediate housing, which is stationary on operation. The other bearing may be provided at the drive-side end of the shaft, thus advantageously outside the housing. Then, only one end of the shaft is to be led out of the housing of the device, so that only one sealing with respect to the housing is required. The drive motor is usefully coupled to the shaft end, which is led out of the housing, and is fastened on the outer side of the housing, so that the motor is seated outside the housing shielded from the fluid, usefully on the housing, so that the motor remains dry even with a failure of the shaft sealing.

It may be advantageous to hydraulically connect the impellers arranged within the plate stack in parallel. These should then be connected to one another in a fluid-leading manner on the suction side via a channel, so that the fluid to be filtered is present at all impellers with essentially the same pressure. The filter plates or the intermediate spaces formed therebetween should likewise be connected in parallel, so that a uniform flushing effect is achieved over the entire filter plate stack.

It may however also be advantageous, depending on the application case, to connect two or more impellers arranged within the plate stack in series or group-wise in series. It is to be understood that then, the filter plates or the intermediate spaces formed therebetween are accordingly arranged in series. With such an arrangement, the dimensioning is usefully effected such that the individual impellers produce a pressure increase, which roughly corresponds to the pressure drop in the intermediate spaces which hydraulically connect thereto. Such an arrangement has the advantage that the filter plates as such are loaded in compressive stress to a low extent and, in particular, are not subjected to deformation caused by pressure.

One essential advantage of the design according to the invention lies in the fact that the filter plate stack is fixed within the housing, i.e., the removal of the filter residues from the filter plates is effected by the centrifugal pumps arranged within the plate stack, in particular by the flow produced by these, and not, as with the prior art, by the rotation of the stack. In order to fix the plate stack within the space which is cylindrical there, and to simultaneously achieve a uniform removal of filtrate over the whole stack, it is advantageous to fix this by preferably three filtrate removal tubes arranged parallel to the axis of the stack, which pass through the filter plate stack and are connected to the inside of the filter plates in a conducting manner. These filtrate removal tubes are sealed to the outside, thus to the intermediate spaces formed between the filter plates, and are in each case fixed with their two ends at the end-side housing parts.

The filter plates, which are used with the filter device according to an embodiment of the invention, are advantageously respectively formed by two spaced filter disks, in particular ceramic disks, between which a support disk is arranged, and which are essentially sealed to one another at the outer and inner periphery. The support disk thereby is provided with a multitude of channels, in order to ensure a removal of the filtrate penetrating the filter disks, over the whole surface. The support disks may be designed as plastic injection molded parts and be designed such that on the one hand they ensure a good filtrate removal over the whole surface of the filter disks, but on the other hand they support these in an as large-surfaced manner as possible, in order in this manner to largely avoid bending loads caused by pressure.

The support disks in their radial extension advantageously have the same size as the ceramic disks, so that they support the ceramic disks from their inner periphery up to the outer periphery. In order to ensure a good filtrate removal with this large surfaced support, it is useful to arrange the channels on the support disk on both sides or in a continuous manner, and specifically in concentric rings over its whole surface, wherein the channels arranged in concentric rings are advantageously crossed by radially running channels which lead to the openings which accommodate the filtrate removal tubes and which are connected to these in a conducting manner. The channels themselves are either formed on both sides of support disks, or by recesses in the support disks, and are open towards the respectively bearing ceramic disk, i.e., they are formed by recesses or deepenings formed in the surface of the support disks, which are delimited by the bearing ceramic disk in a channel-forming manner.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. There are shown in the drawings:

FIG. 5 is a perspective view of the centrifugal pump unit arranged within the filter device;

FIG. 6 is a unit according to FIG. 5, in a longitudinal section;

FIG. 7 is a detail VII in FIG. 6, in an enlarged representation;

FIG. 8 is a detail VIII in FIG. 6, in an enlarged representation;

DETAILED DESCRIPTION OF THE INVENTION

Figure 1:
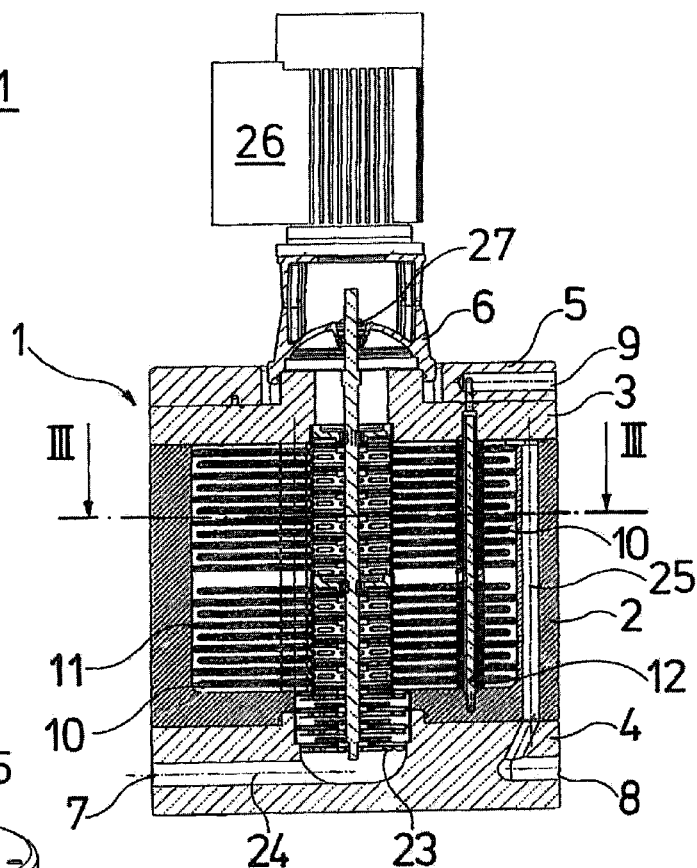
FIG. 1 is a filter device in a simplified, schematic representation in a longitudinal section, with an assembled drive motor.
Figure 2:
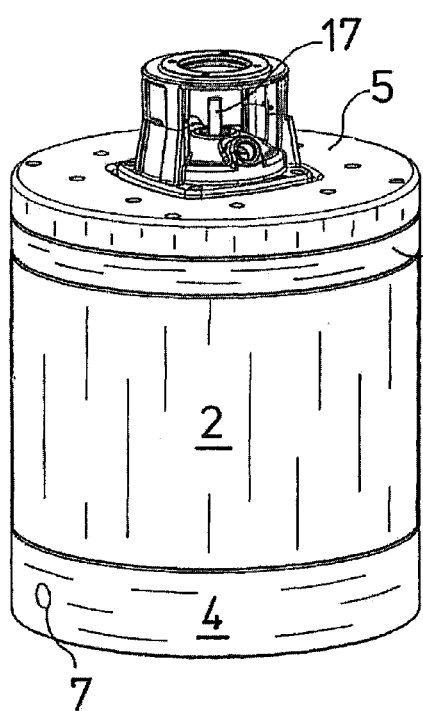
FIG. 2 is a filter device according to FIG. 1, in a perspective view without a motor.
Figure 3:
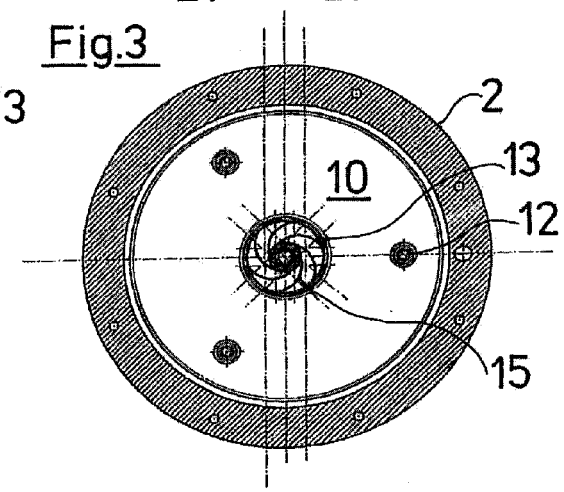
FIG. 3 is a section along the section line III-III in FIG. 1.

The filter device represented by FIGS. 1 to 3 comprises an essentially cylindrical housing 1 which, with the shown embodiment, is formed of a pot-like housing 2, a lid part 3 which terminates this housing part 2 to the top, and a base part 4 which connects to the pot-like housing 2 to the bottom. The lid part 3 is covered to the top by an annular housing part 5. A coupling housing part 6 connects to the lid part 3 at the top and is integrated within the annular housing part 5 at a distance. The housing 1, which is formed in such a manner, forms a closed receptacle which in the base part 4 comprises an inlet 7 for the fluid to be filtered, as well as an outlet 8 for the residual fluid with the filter residues. Furthermore, an outlet 9 for the filtrate is provided in the annular housing part 5.

The housing parts 2, 3, 4 and 5 have the same outer diameter and are arranged aligned to one another, such that an essentially cylinder-shaped housing 1 is formed by them. The housing part 2 is essentially pot-like and is designed open to the top towards the housing part 3 (in the representation according to FIG. 1), and serves for receiving a filter plate stack consisting of filter plates 10 and 11, which are arranged respectively spaced from one another in an alternating manner. The filter plates 10 have a smaller diameter than that of the cylindrical inner space of the housing part 2, so that they end at a distance from the housing wall. The filter plates 11 in contrast have the same diameter as the inner space, and are sealingly led up to the housing part 2. The filter plates 10 and 11 are fixed and held within the housing part 2 at a spacing from one another by three filtrate removal tubes 12, respectively offset from one another by 120° about the axis of the housing within the housing 1. The filter plates, which are hollow and whose construction will yet be described in detail further below, are connected with their inside to the filtrate removal tubes 12 in a fluid-leading manner, these tubes being held with a positive-fit in the base of the housing part 2 as wells in the lid part 3 in suitable recesses. The recesses in the lid part 3 simultaneously form channels, which connect to corresponding recesses in the annular housing part 5 which are flush to the channels and which in turn run into an annular channel, which is connected to the outlet 9 via a radial channel. The filter plates 10 and 11 are held at a defined distance to one another via the filtrate removal tubes 12, and corresponding spacers are provided on the filtrate removal tubes 12 respectively between a filter plate 10 and a filter plate 11.

The filter plates 10 and 11 comprise central, circular recesses 13, which are flush to one another in the stack arrangement, and form a cavity passing through the filter plate stack, in which a centrifugal pump 14 with several impellers 15 is arranged, whose construction is evident in detail by the FIGS. 5 to 8. The centrifugal pump 14 is designed as an automatically manipulable unit together with a centrifugal pump 16 arranged upstream and with a common shaft 17. The centrifugal pump 14 with its impellers 15 is arranged within a cylindrical intermediate housing 18 which comprises a multitude of elongate hole-like recesses 19 which are annularly distributed over the periphery. These recesses 19 respectively lie flush to the intermediate spaces formed between the filter plates 10 and 11, as well as aligned to the suction side 20 and the pressure side 21 of an impeller 15 in an alternating manner.

The impellers 15 are assembled in a rotationally fixed manner at suitable spacing on the shaft 17, as is evident from FIG. 7. Thereby, each of the impellers 15, on the suction side as well as on the pressure side, are sealed with respect to the intermediate housing 18, and specifically on the same periphery, specifically the outer diameter, as is represented by FIG. 8. The filter plates 10 and 11 are again likewise sealed to the inside with respect to the intermediate housing 19, and respectively bear on the housing 18, between the annularly arranged rows of recesses 19, in a manner such that a multi-stage centrifugal pump is formed, wherein however the individual pump stages (impellers 15), are not connected directly via the housing as with multi-stage pumps, but via the intermediate spaces between the filter plates, which formed between adjacent filter plates 10, 11; 11, 10.

Connected hydraulically upstream of the centrifugal pump 14 is the centrifugal pump 16, with which, in the represented embodiment, it is the case of a four-stage pump, whose pump housing 22 connects to the bottom to the intermediate housing 18 and which has a significantly larger diameter compared to this. Accordingly, the base of the housing part 2 as well as the base part 4 is provided with a suitable recess, into which the pump housing 22 engages in a flush manner or forms the part of the pump housing of the first pump stage (see FIG. 1). The impellers 23 have a larger diameter than the impellers 15 and are connected in series into a four-stage pump 16 by the pump housing 22. The suction port of this impeller 16 is connected via a channel 24 to the inlet 7, via which the fluid to be filtered is supplied.

The centrifugal pump 16 arranged upstream, which here by example is designed as a four-stage pump, may basically comprise infinitely many pump stages connected in parallel or series, and serves essentially for leading the fluid to be filtered to the filter plate stack, and specifically in the required quantity with the required pressure.

The centrifugal pump 14, which is arranged within the filter plate stack, serves essentially for circulating fluid which flows past between the filter plates 10 and 11, in particular for removing the filter residues collecting there, but may also serve for improving the throughflow of the plates 10, 11 themselves. With the embodiment according to FIG. 1, the fluid to be filtered, via the centrifugal pump 16 arranged upstream, centrally reaches the suction port of the impeller 15, lowermost in FIG. 1, of the centrifugal pump 14, whose pressure side is connected to the free space between the lowermost filter plate 10 and the base of the housing part 2. The fluid delivered by this impeller thus first flows on the lower side of the lowermost filter plate 10 essentially radially outwardly, where it is deflected by 180°, in order then at the upper side of the lowermost filter plate 10 and the lower side of the lowermost filter plate 11 lying thereabove, to flow radially inwardly again to the suction side 20 of the subsequent impeller 15. With the embodiment represented by FIG. 1, thus the impellers and intermediate spaces of the filter plates 10, 11 are subjected to throughflow successively in series, until finally the pressure side 21 of the uppermost impeller 15 delivers the fluid having the filter residues, along the uppermost filter plate 11 and the lower side of the lid part 3 radially to the outside to a channel 25, which is arranged parallel to the axis in the wall of the housing part 22, and leads to the outlet 8 in the base part 4.

The centrifugal pumps 14 and 16 are driven via a common shaft 17 which with its upper shaft end is led through the coupling housing part 6 out of the housing 1 for the purpose of drive. As indicated in FIG. 1, an electric motor 26, whose shaft is connected in drive to the shaft end of the shaft 17 and which drives the centrifugal pumps 14 and 16, is seated on the coupling housing part 6 on the upper side. The shaft 17 is mounted within the coupling housing part 6, but already outside the housing 1, in a bearing 27. Furthermore, the shaft 17 is mounted roughly in the middle of the impellers 15 and 23 by a bearing 28 which is supported on the intermediate housing 28.

The unit represented by FIGS. 5 and 6, comprising the centrifugal pumps 14, 16, the common shaft 17, the lower bearing 28 and the housings 18 and 22, may be withdrawn downwardly out of the filter plate stack and the housing 1 after removal of the base part 4. If on the other hand, only the filter plate stack is to be removed from the housing 1, then the lid part 3 as well as the annular housing part 5 on the upper side, are to be removed from the housing part 2, wherein the filter plate stack, fastened on the filtrate removal tubes 12, is pulled out of the housing.

Figure 4:
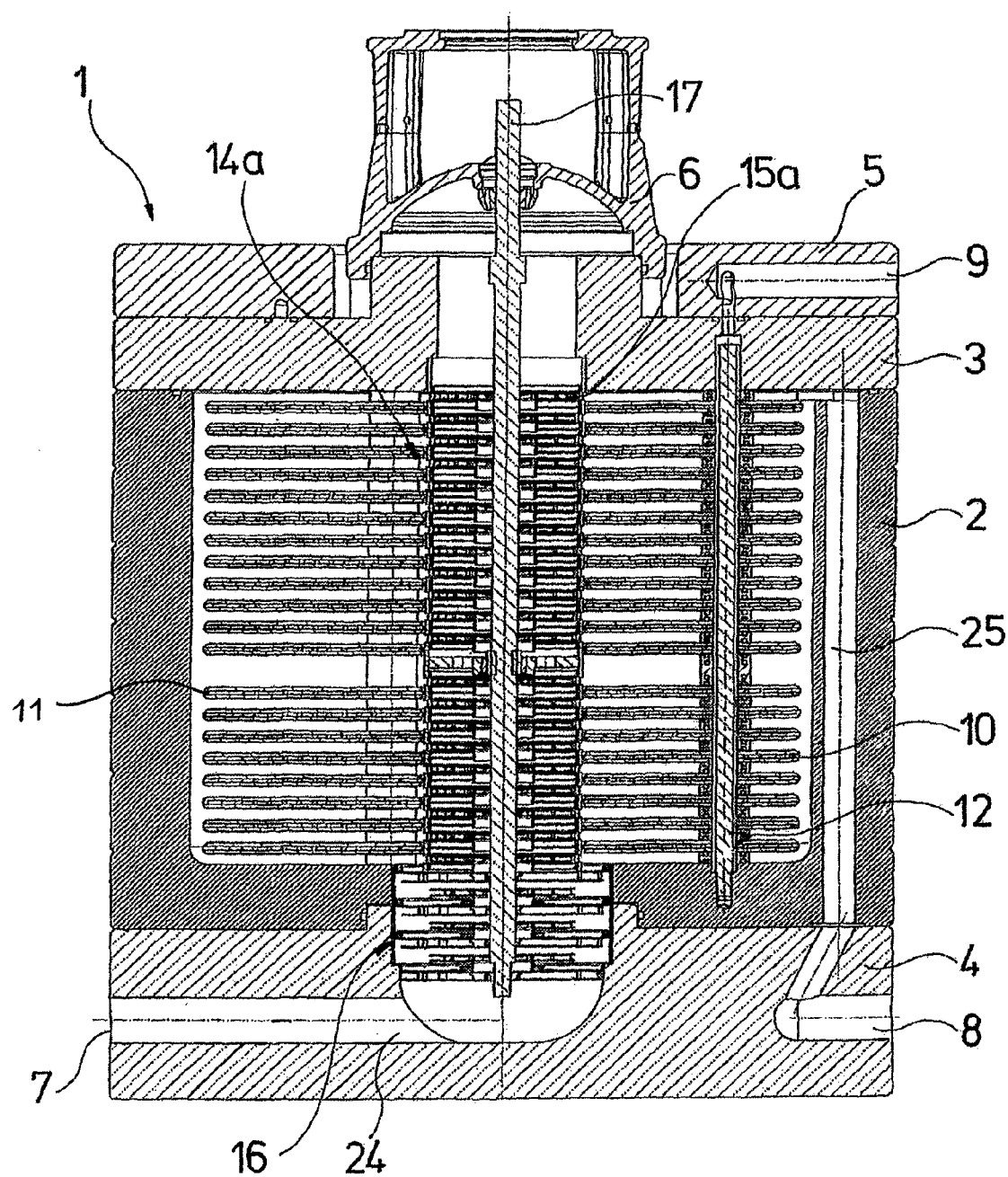
FIG. 4 is a further embodiment of a filter device in an enlarged representation according to FIG. 1.

With the embodiment according to FIG. 4, a centrifugal pump 14*a* is provided instead of a multi-stage centrifugal pump 14, and this centrifugal pump differs with respect to the centrifugal pump 14, in that the number of impellers 15*a* is designed such that an impeller 15*a* is allocated to each intermediate space between adjacent filter plates 10 or a filter plate 10 and the housing part 2 or the housing part 3. Furthermore, the impellers 15*a* are not arranged hydraulically in series, but in parallel. For this, they comprise an annular channel around the shaft 17, this channel continuing the suction port and via which all impellers 15 may be supplied in parallel with fluid to be filtered, which are supplied via the centrifugal pump. The filter plates 10 are all subjected to peripheral flow from the inside to the outside. They therefore all end at a distance to the housing part 2.

Figure 10:
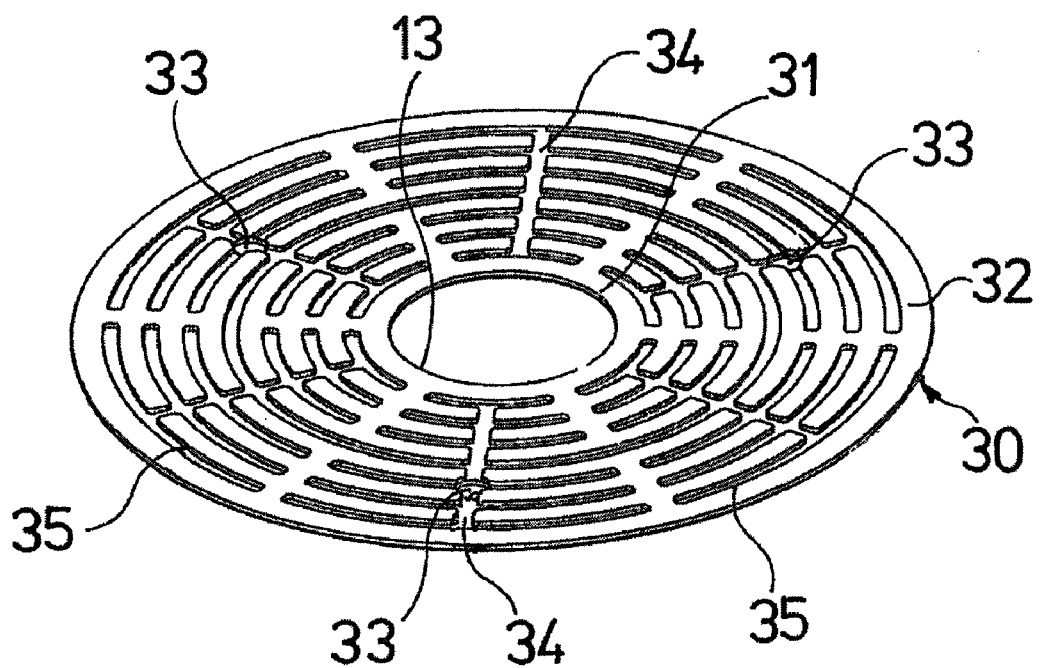
FIG. 10 is a support disk in a perspective view.
Figure 9:
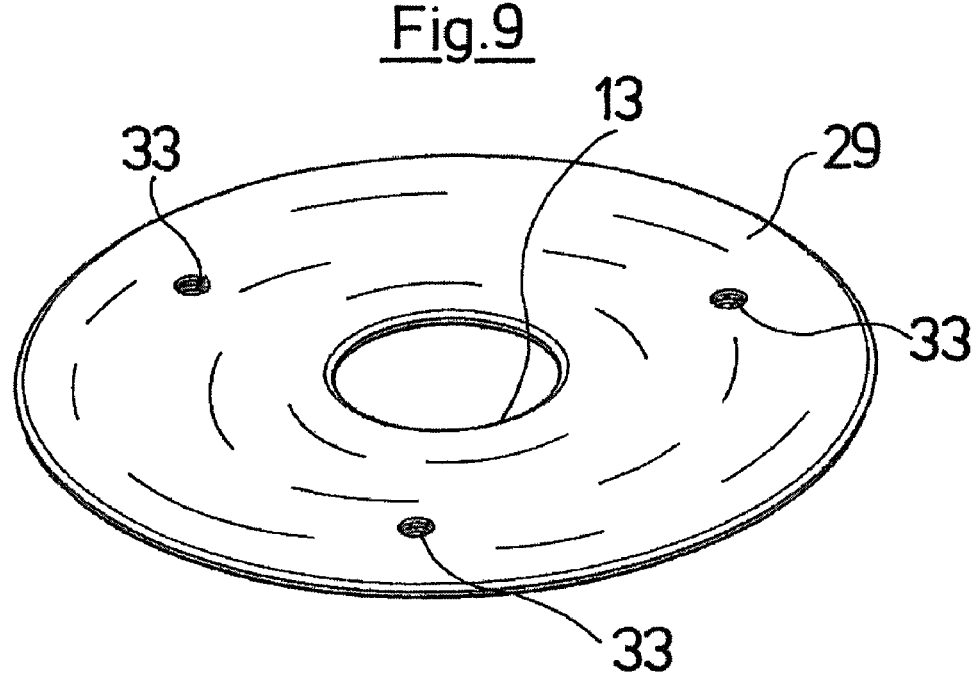
FIG. 9 is a ceramic filter disk in a perspective view.

The construction of a filter plate 10 or 11 is shown in detail by FIGS. 9 and 10. Each filter plate 10 and 11 comprises two annular, ceramic disks 29 and a likewise annular support disk 30 arranged therebetween. The support disk 30 is designed as a plastic injection molded part and comprises a closed inner ring 31 and a closed outer ring 32. The inner diameter of the inner ring 31 corresponds to that of the ceramic disk 29, the outer diameter of the outer ring 32 likewise corresponds to that of the ceramic disk 29, so that when applying two ceramic disks onto one another while incorporating the support disk 30, a filter plate 10 or 11 arises, depending on the dimensions, which toward its inner periphery 31, as well as its outer periphery 32, is closed in an essentially sealed manner, and whose inside comprises a channel system which leads the filtrate, which has got through the ceramic disk 29, to the filtrate removal tubes 12.

Recesses 33 which are aligned to one another are provided in the disks 29, as well as the disk 30, for connection of these filtrate removal tubes 12. The filtrate removal tubes 12 are designed in a manner such that they are open in the region of the recesses 33 of the support disks, but are otherwise designed in a closed manner.

Recesses 34 which are crossed by annular, interrupted recesses 35, which in turn lead to radial recesses 34, and which run radially between the inner ring 31 and the outer ring 32, connect to the recesses 33 is the support disks. As FIG. 10 illustrates, a surfaced and rangy channel network is formed in this manner over the whole surface of the filter plate by the recesses 34 and 35, via which network an effective filtrate removal on the one hand, and a support effect with respect to the ceramic disks 29, which is uniform over the surface, is effected. The filter plates 10 and 11 formed in this manner are provided for an essentially sealed bearing on the intermediate housing 18, as well as, inasmuch as it concerns the filter plates 11, for the sealing bearing on the housing part 2 of the housing 1.

The previous embodiment examples, in particular represented by the FIGS. 1 and 4, serve essentially for the representation of the inventive principle. It is to be understood that not only the centrifugal pump 16, but also the centrifugal pump 14, may be selectively designed in pump stages arranged in parallel and/or in series, depending on the demands (number of filter plates, composition of the fluid to be filtered, dimensioning of the filter plates, etc.). The housing part 2 represented in the figures, may likewise be designed in a modular manner, wherein then, usefully a housing section is allocated to each impeller, and the housing sections are connected to one another with a positive fit and in a sealing manner. The base of the housing part 2 with such a design is usefully then allocated to the base part 4. The intermediate housing may also be constructed in a modular manner, wherein advantageously an intermediate housing part is allocated to each impeller 14. The intermediate housing parts may be formed as injection molded parts and likewise be connected to one another with a positive fit. A sealing of the housing parts to one another proceeding from a planar contact, as a rule, is not necessary.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A filter device comprising a housing (1), a stack of filter plates (10, 11) arranged therein at a spacing from one another, an inlet (7) for a fluid to be filtered, an outlet (9) for a filtrate which is connected to an inside of the filter plates (10, 11) in a conducting manner and a cavity extending through the stack and formed by recesses (13) in the filter plates (10, 11), wherein the filter plate stack is arranged fixed to the housing and a centrifugal pump (14) having several impellers (15) is arranged within the filter plate stack, wherein an impeller (15) is respectively allocated to an intermediate space formed between adjacent filter plates (10, 11) or to a group of adjacent intermediate spaces, the impeller impinging the intermediate space or the intermediate spaces with fluid, and wherein the impellers (15) arranged within the plate stack are surrounded by a tubular intermediate housing (18), which is seated in the cavity, connects to the plate stack in a sealing manner, and comprises openings (19) in the region of free spaces between adjacent filter plates, by which openings a pressure side (21) of an impeller (15) is connected to an allocated intermediate space in a fluid-leading manner.

2. The filter device according to claim 1, wherein the intermediate housing is constructed from several housing sections, which are designed as plastic injection molded parts and are connected to one another with a positive fit.

3. The filter device according to claim 2, wherein a filter plate is allocated to each housing section of the intermediate housing, and the housing section is radially sealed with respect to this filter plate.

4. The filter device according to claim 1, wherein the impellers (15) arranged within the plate stack reach up to a vicinity of the intermediate housing (18), wherein these impellers (15) are sealed radially with respect to the intermediate housing (18) to the same diameter, on a suction side as well as a pressure side.

5. The filter device according to claim 1, wherein the impellers (15, 23) are arranged in a rotationally fixed manner on a common shaft (17), and together with the intermediate housing (18) form a unit which may be manipulated together.

6. The filter device according to claim 5, wherein the shaft (17) carrying the impellers (15, 23) comprises at least one bearing (28) arranged within the plate stack, the bearing being arranged in the intermediate housing (18).

7. The filter device according to claim 5, wherein the shaft (17) carrying the impellers (15, 23) is led out of the housing (1) at one end for drive purposes and is drive-connected to a drive motor (26) fastened on the housing (1).

8. The filter device according to claim 7, wherein an end of the shaft (17) which is led out of the housing is rotatably mounted on and outside the housing.

9. A filter device comprising a housing (1), a stack of filter plates (10, 11) arranged therein at a spacing from one another, an inlet (7) for a fluid to be filtered, an outlet (9) for a filtrate which is connected to an inside of the filter plates (10, 11) in a conducting manner, and a cavity extending through the stack and formed by recesses (13) in the filter plates (10, 11), wherein the filter plate stack is arranged fixed to the housing and a centrifugal pump (14) having several impellers (15) is arranged within the filter plate stack, wherein one or more impellers (23) within the housing (1) are fluidically arranged upstream of the impellers (15) arranged within the plate stack.

10. The filter device according to claim 9, wherein the impellers (23) arranged upstream of the impellers (15) within the plate stack are designed and arranged as a multi-stage centrifugal pump (16) in a suitably designed recess of the housing (1).

11. The filter device according to claim 9, wherein the housing (1) with its inner side is designed adapted to the geometry of the plate stack as well as to the impellers (23) arranged upstream.

12. The filter device according to claim 9, wherein the impellers (23) arranged upstream of the impellers (15) within the plate stack have a greater diameter than those located within the plate stack.

* * * * *